US009705583B2

(12) United States Patent
Yu et al.

(10) Patent No.: US 9,705,583 B2
(45) Date of Patent: Jul. 11, 2017

(54) COMMUNICATION DEVICE AND METHOD OF CONTROLLING SAME

(71) Applicant: Samsung Electronics Co., Ltd., Gyeonggi-do (KR)

(72) Inventors: Hyun-Seok Yu, Seoul (KR); Do-Yun Kim, Gyeonggi-do (KR); Beom-Kon Kim, Seoul (KR); Hwan-Min Park, Gyeongsangnam-do (KR); Chae-Hag Yi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/130,317

(22) Filed: Apr. 15, 2016

(65) Prior Publication Data

US 2017/0085310 A1 Mar. 23, 2017

(30) Foreign Application Priority Data

Sep. 21, 2015 (KR) ........................ 10-2015-0133231

(51) Int. Cl.
*H04B 17/00* (2015.01)
*H04B 7/08* (2006.01)
*H04B 17/318* (2015.01)
*H04B 17/21* (2015.01)

(52) U.S. Cl.
CPC ........... *H04B 7/0814* (2013.01); *H04B 17/21* (2015.01); *H04B 17/318* (2015.01)

(58) Field of Classification Search
CPC .... H04B 17/21; H04B 7/0608; H04B 17/309; H04B 17/318

USPC ........ 455/562.1, 67.11, 575.7; 342/423, 434; 370/334

See application file for complete search history.

(56) References Cited

U.S. PATENT DOCUMENTS

| | | | |
|---|---|---|---|
| 6,370,369 B1 * | 4/2002 | Kraiem | H04B 7/0608 375/267 |
| 8,577,392 B1 | 11/2013 | Pai et al. | |
| 9,236,998 B2 * | 1/2016 | Wang | H04L 25/0398 |
| 2008/0181172 A1 | 7/2008 | Angelhag et al. | |
| 2011/0249760 A1 * | 10/2011 | Chrisikos | H01Q 1/243 375/259 |
| 2013/0064277 A1 * | 3/2013 | Liao | H04B 17/12 375/224 |
| 2015/0139046 A1 * | 5/2015 | Wang | H04L 25/0398 370/278 |

* cited by examiner

*Primary Examiner* — Sonny Trinh
(74) *Attorney, Agent, or Firm* — The Farrell Law Firm, P.C.

(57) ABSTRACT

A communication device and a method of controlling the same. The communication device includes at least one receiver configured to connect to a first antenna for receiving a first signal and a second antenna for receiving a second signal; and a processor electrically coupled to the at least one receiver, wherein the processor is configured to measure received signal strengths of the first signal and the second signal based on calibration operation for the first antenna and the second antenna, select one of the first antenna and the second antenna based on the measured received signal strengths, and control the at least one receiver to receive a signal through the selected one of the first antenna and the second antenna.

13 Claims, 6 Drawing Sheets

COMMUNICATION DEVICE AND METHOD OF CONTROLLING SAME

PRIORITY

This application claims priority under 35 U.S.C. §119(a) to a Korean Patent Application filed on Sep. 21, 2015 in the Korean Intellectual Property Office and assigned Serial No. 10-2015-0133231, the entire contents of which are incorporated herein by reference.

BACKGROUND

1. Field of the Disclosure

The present disclosure relates generally to a communication device and a method of controlling the same, and more particularly, to a communication device capable of having performance advantages of a diversity function (also referred to as diversity) while reducing power consumption, and a method of controlling the same.

2. Description of the Related Art

Currently, even though a user equipment (UE) has been reduced in size and weight, a function for providing mobile communication services for various frequency bands through one terminal is required. In addition, in a wireless communication field, particularly, in a mobile communication field, a diversity antenna is used to mitigate fading caused by multipath signal propagation.

Various reception antenna diversity methods, for example, equal gain combining (EGC), maximal ratio combining (MRC), space-time block code (STBC), space-frequency block code (SFBC), and multi-input multi-output (MIMO) are provided. In general, a UE operates a diversity function in spite of an increase in power consumption when there is concern of a dropped call or when a signal having a high quality of service (QoS) is received in a weak electrical condition. Further, in a good electrical condition or when there is no service having an especially high QoS, a UE disables a diversity function in consideration of battery consumption.

Since there are independent noise components in two or more radio frequency (RF) integrated circuit (IC) paths, diversity performance has advantages in that a signal to noise ratio (SNR) may be improved if a receiver performs combining. Further, when an SNR of one antenna deteriorates when an SNR of the other antenna is high, a loss of a reception packet may be prevented through the other antenna.

In order to use diversity, at least two antennas (e.g., at least two paths) should be in an enabled state (e.g. an "on state"), which increases power consumption. Due to an increase in power consumption, the time during which all antenna paths may be enabled for diversity is limited when a UE is actually used and, as a result, the time during which diversity performance advantages may be realized is limited.

SUMMARY

An aspect of the present disclosure provides a communication device, which may continuously realize diversity performance advantages by measuring a signal reception state of an antenna according to a measurement period of signal quality determined based on a calibration process or an estimated Doppler frequency and controlling an antenna having a higher performance to receive a signal, and may reduce power consumption by using only one (or more) antenna when the signal is received.

Another aspect of the present disclosure provides a method of controlling a communication device, which may continuously realize diversity performance advantages by measuring a signal reception state of an antenna according to a measurement period of signal quality determined based on a calibration process or an estimated Doppler frequency and controlling an antenna having a higher performance to receive a signal, and may reduce power consumption by using only one (or more) antenna when the signal is received.

Another aspect of the present disclosure provides a UE including a communication device, which may continuously realize diversity performance advantages by measuring a signal reception state of an antenna according to a measurement period of signal quality determined based on a calibration process or an estimated Doppler frequency and controlling an antenna having a higher performance to receive a signal, and may reduce power consumption by using only one (or more) antenna when the signal is received.

Another aspect of the present disclosure provides a method of controlling a UE including a communication device, which may continuously realize diversity performance advantages by measuring a signal reception state of an antenna according to a measurement period of signal quality determined based on a calibration process or an estimated Doppler frequency and controlling an antenna having a higher performance to receive a signal, and may reduce power consumption by using only one (or more) antenna when the signal is received.

Another aspect of the present disclosure provides a method of continuously realizing diversity performance advantages by measuring a signal reception state of an antenna according to a measurement period of signal quality determined based on a calibration process or an estimated Doppler frequency and controlling an antenna having a higher performance to receive a signal, and to reduce power by using only one (or more) antenna when the signal is received.

In accordance with an aspect of the present disclosure, a communication device is provided. The communication device includes at least one receiver configured to connect to a first antenna for receiving a first signal and a second antenna for receiving a second signal; and a processor electrically coupled to the at least one receiver, wherein the processor is configured to measure received signal strengths of the first signal and the second signal based on calibration operation for the first antenna and the second antenna, select one of the first antenna and the second antenna based on the measured received signal strengths, and control the at least one receiver to receive a signal through the selected one of the first antenna and the second antenna.

In accordance with another aspect of the present disclosure, a method of controlling a communication device is provided. The method includes measuring received signal strengths of a first signal and a second signal based on calibration for a first antenna for receiving the first signal and a second antenna for receiving the second signal; selecting one of the first antenna and the second antenna based on the measured received signal strengths of the first signal and the second signal; and receiving a signal through the selected one of the first antenna and the second antenna.

In accordance with another aspect of the present disclosure, a method of controlling a communication device is provided. The method includes measuring a quality of a first signal received by a first antenna; determining a period for measuring a quality of a second signal received by a second antenna based on a velocity of the communication device; and measuring the quality of the second signal according to the determined period for measuring and selecting one of the first antenna and the second antenna for receiving a signal based on the measured quality of the first signal and the measured quality of the second signal.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1A:
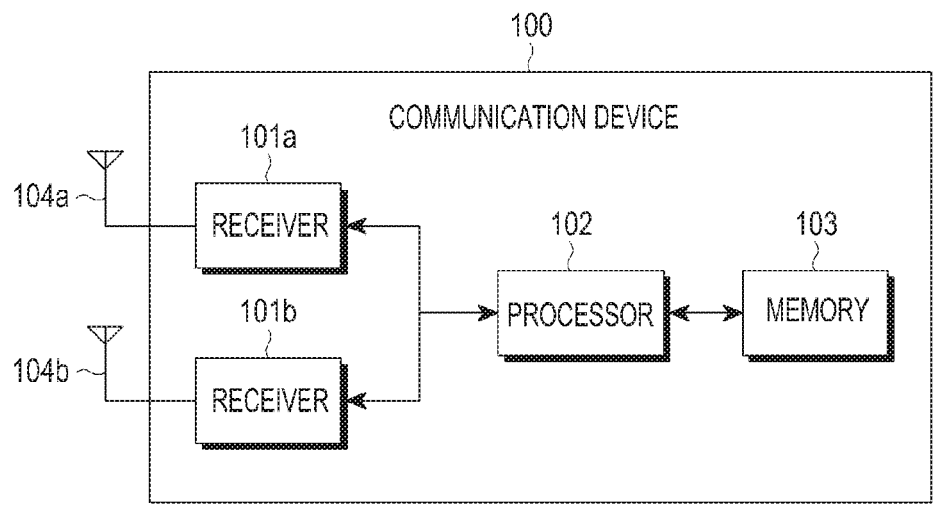
FIG. 1A is a block diagram of a communication device according to an embodiment of the present disclosure.

Hereinafter, various embodiments of the present disclosure are described with reference to the accompanying drawings. However, it should be understood that there is no intent to limit the present disclosure to the particular forms disclosed herein; rather, it is intended that the present disclosure should be construed to cover various modifications, equivalents, and/or alternatives of embodiments of the present disclosure. In describing the accompanying drawings, similar reference numerals may be used to designate similar elements.

As used herein, the terms "have," "may have," "include," or "may include" refer to the existence of a corresponding feature (e.g., a numeral, a function, an operation, or an element such as a component), and do not exclude one or more additional features.

In the present disclosure, the terms "A or B," "at least one of A and/or B," or "one or more of A and/or B" may include all possible combinations of the items listed. For example, the terms "A or B," "at least one of A and B," or "at least one of A or B" refer to all of (1) including at least one A, (2) including at least one B, and (3) including at least one A and at least one B.

The terms "a first," "a second," "the first," or "the second" used in various embodiments of the present disclosure may modify various components regardless of order and/or importance but is not intended to limit the corresponding components. For example, a first user device and a second user device indicate different user devices even though both of them are user devices. For example, a first element may be referred to as a second element, and similarly, a second element may be referred to as a first element without departing from the scope and spirit of the present disclosure.

When it is recited that one element (e.g., a first element) is "(operatively or communicatively) coupled with/to or connected to" another element (e.g., a second element), it is intended to be construed that one element is directly connected to the other element or one element is indirectly connected to the other element via yet another element (e.g., a third element). In contrast, it may be understood that when an element (e.g., a first element) is referred to as being "directly connected" or "directly coupled" to another element (e.g., a second element), there is no element (e.g., a third element) interposed between them.

The term "configured to" recited in the present disclosure may be used interchangeably with, for example, "suitable for," "having the capacity to," "designed to," "adapted to," "made to," or "capable of" according to the situation. The term "configured to" may not necessarily indicate "specifically designed to" in hardware. Alternatively, in some situations, the term "device configured to" may indicate that the device, together with other devices or components, "is able to." For example, the term "control module adapted (or configured) to perform A, B, and C" may indicate a dedicated control module (e.g. an embedded control module) only for performing corresponding operations or a general-purpose control module (e.g., a central processing unit (CPU) or an application processor (AP)) that may perform corresponding operations by executing one or more software programs stored in a storage module.

The terms recited herein are merely for the purpose of describing particular embodiments of the present disclosure and are not intended to limit the scope of the present disclosure. As recited herein, singular forms may include plural forms as well unless the context clearly indicates otherwise. Unless defined otherwise, all terms used herein have the same meanings as those commonly understood by a person skilled in the art to which the present disclosure pertains. Such terms as those defined in a generally used dictionary may be interpreted to have the meanings as the contextual meanings in the relevant field of art, and are not intended to be interpreted to have ideal or excessively formal meanings unless clearly defined in the present disclosure. In some cases, even the terms defined in the present disclosure should not be interpreted to exclude embodiments of the present disclosure.

Hereinafter, a communication device and a user terminal according to various embodiments of the present disclosure are described with reference to the accompanying drawings. In the present disclosure, the term "user" may refer to a person using a communication device, an apparatus using a communication device (for example, an artificial intellegence electronic device), a person using a user terminal, or a device using a user terminal.

FIG. 1A is a block diagram of a communication device 100 according to an embodiment of the present disclosure.

Referring to FIG. 1A, the communication device 100 according to an embodiment of the present disclosure may include at least one of one or more receivers 101a and 101b, antennas (for example, a first antenna 104a and a second antenna 104b) connected to the one or more receivers 101a and 101b, a processor 102, and a memory 103.

Figure 1B:
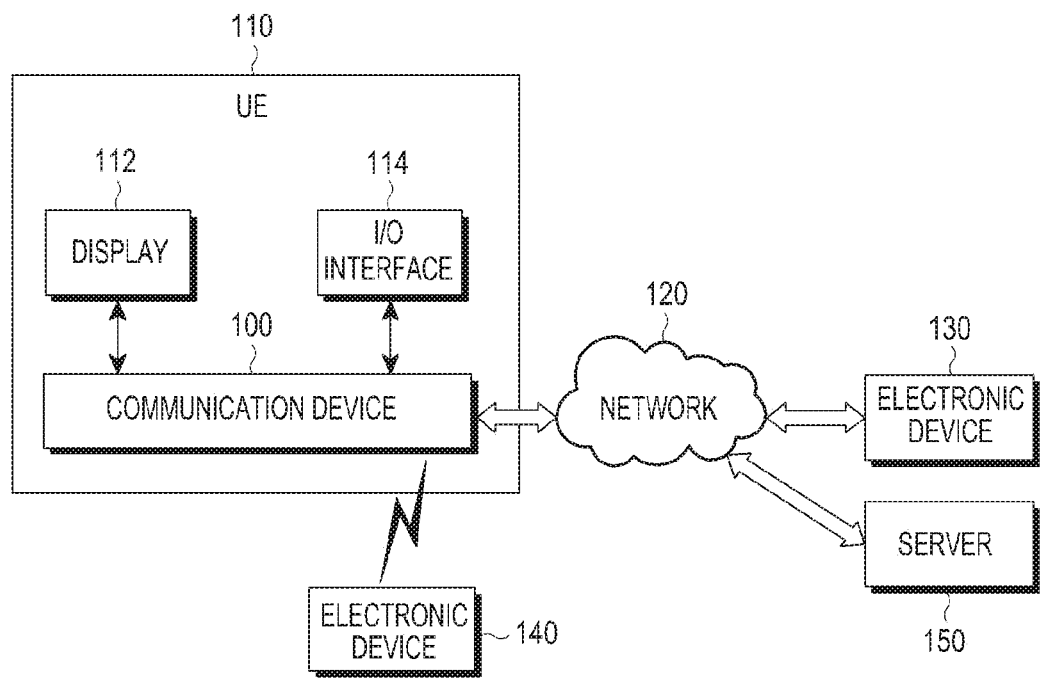
FIG. 1B is a block diagram of a UE including a communication device according to an embodiment of the present disclosure.

The one or more receivers 101a and 101b may establish communication between, for example, the communication device 100 and an external device (for example, a first external electronic device 130, a second external electronic device 140, or a server 150 shown in FIG. 1B). The receivers 101a and 101b may receive various signals output from the external devices 130-150 through the first and second antennas 104a and 104b. For example, the one or more receivers 101a and 101b may be connected to a network 120 shown in FIG. 1B through wireless communication or wired communication and may receive a signal from an external device.

Wireless communication may use at least one of, for example, long term evolution (LTE), LTE-advance (LTE-A), CDMA, wideband CDMA (WCDMA), universal mobile telecommunications system (UNITS), wireless broadband (WiBro), and global system for mobile communications (GSM) as a cellular communication protocol. Further, wireless communication may include, for example, short-range communication. Short range communication may include at least one of, for example, wireless fidelity (Wi-Fi), bluetooth, near field communication (NFC), and global navigation satellite system (GNSS). The GNSS may include at least one of, for example, a global positioning system (GPS), a global navigation satellite system (Glonass), a beidou navigation satellite system ("Beidou"), and a european global satellite-based navigation system ("Galileo"), according to a use area, a bandwidth, or the like. "GPS" may be interchangeably used with "GNSS." Wired communication may include at least one of, for example, a universal serial bus (USB), a high definition multimedia interface (HDMI), recommended standard 232 (RS-232), and a plain old telephone service (POTS). The network 120 shown in FIG. 1B may include at least one of communication networks such as a computer network (for example, a local area network (LAN) or a wide area network (WAN)), an internet, and a telephone network.

FIG. 1A illustrates an example of a case where the first antenna 104a is connected to one receiver 101a. However, according to an embodiment of the present disclosure, a plurality of antennas may be connected to one receiver 101a, and the one or more receivers 101a and 101b may be replaced with one or more transceivers. The terms "receivers 101a and 101b" and "transceiver" may be interchangeably used with various terms such as "communication module" or "communication interface." Further, although the number of antennas is 2 in FIG. 1A, this is only an example for describing the present disclosure and two or more antennas (for example, four antennas) may be included.

The one or more receivers 101a and 101b may include at least one of an RF IC for processing a received signal, an analog to digital converter (ADC), a low pass filter (LPF), and a channel estimator.

The processor 102 may include a communication processor (CP). According to an embodiment of the present disclosure, the processor 102 may include one or more of a CPU and an AP. The processor 102 may perform, for example, operations or data processing related to control and/or communication of at least one other element of the communication device 100. According to an embodiment of the present disclosure, the term "processor" is interchangeable with various terms such as "control module," "control unit," and "controller."

The processor 102 may include at least one of a received signal strength indicator (RSSI) estimation module, a signal to interference-plus-noise ratio (SINR) estimation module, a Doppler estimation module, and an antenna switching control module.

The memory 103 may include a volatile memory and/or a non-volatile memory. The memory 103 may store, for example, instructions or data related to at least one other element of the communication device 100. According to an embodiment of the present disclosure, the memory 103 may store software and/or a program. A program may include, for example, a kernel, middleware, an application programming interface (API), and/or an application program (or "application"). Although FIG. 1A illustrates that the memory 103 is included in the communication device 100, this is only an example for describing the present disclosure. The memory 103 may be omitted in a process of manufacturing the communication device 100.

FIG. 1B is a block diagram of a UE 110 including the communication device 100 according to an embodiment of the present disclosure.

Referring to FIG. 1B, the UE 110 according to an embodiment of the present disclosure may include the communication device 100, a display 112, and an input/output interface 114.

The display 112 may include, for example, a liquid crystal display (LCD), a light-emitting diode (LED) display, an organic light-emitting diode (OLED) display, a micro electro mechanical systems (MEMS) display, and an electronic paper display. The display 112 may display, for example, various types of contents (for example, text, images, videos, icons, or symbols) to a user. The display 112 may include a touch screen and may receive, for example, a touch input, a gesture input, a proximity input, or a hovering input using an electronic pen or a part of a user's body.

The input/output interface 114 may serve as an interface that may transfer instructions or data, which is input from a user or an external device, to another element(s) of the UE 110. Further, the input/output interface 114 may output instructions or data received from another element(s) of the UE 110 to a user or another external device.

According to an embodiment of the present disclosure, the UE 110 may further include a storage module (for example, a memory) or a processor (for example, an application processor).

Figure 2A:
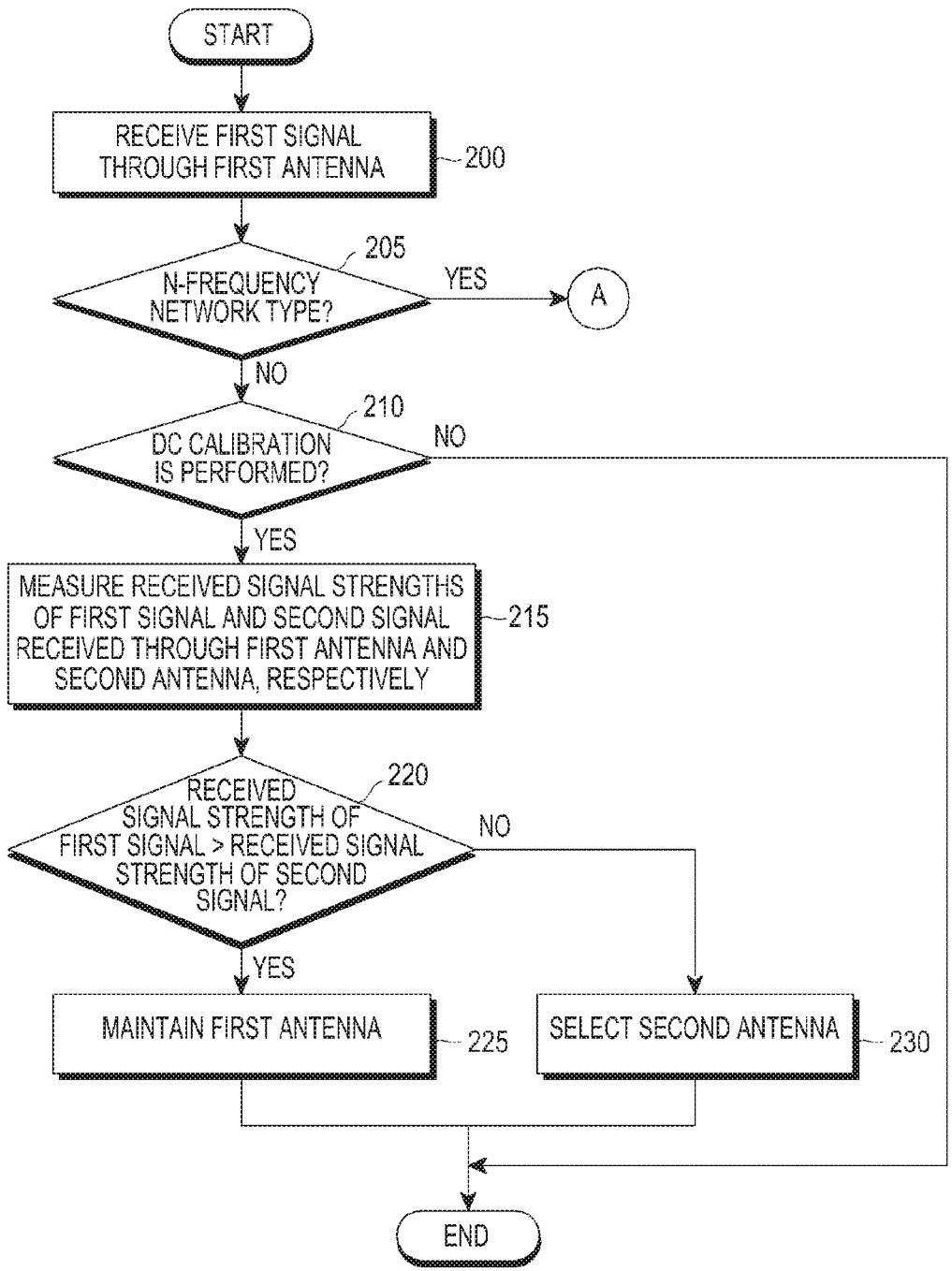
FIGS. 2A and 2B are flowcharts of methods of controlling a communication device according to an embodiment of the present disclosure.
Figure 2B:
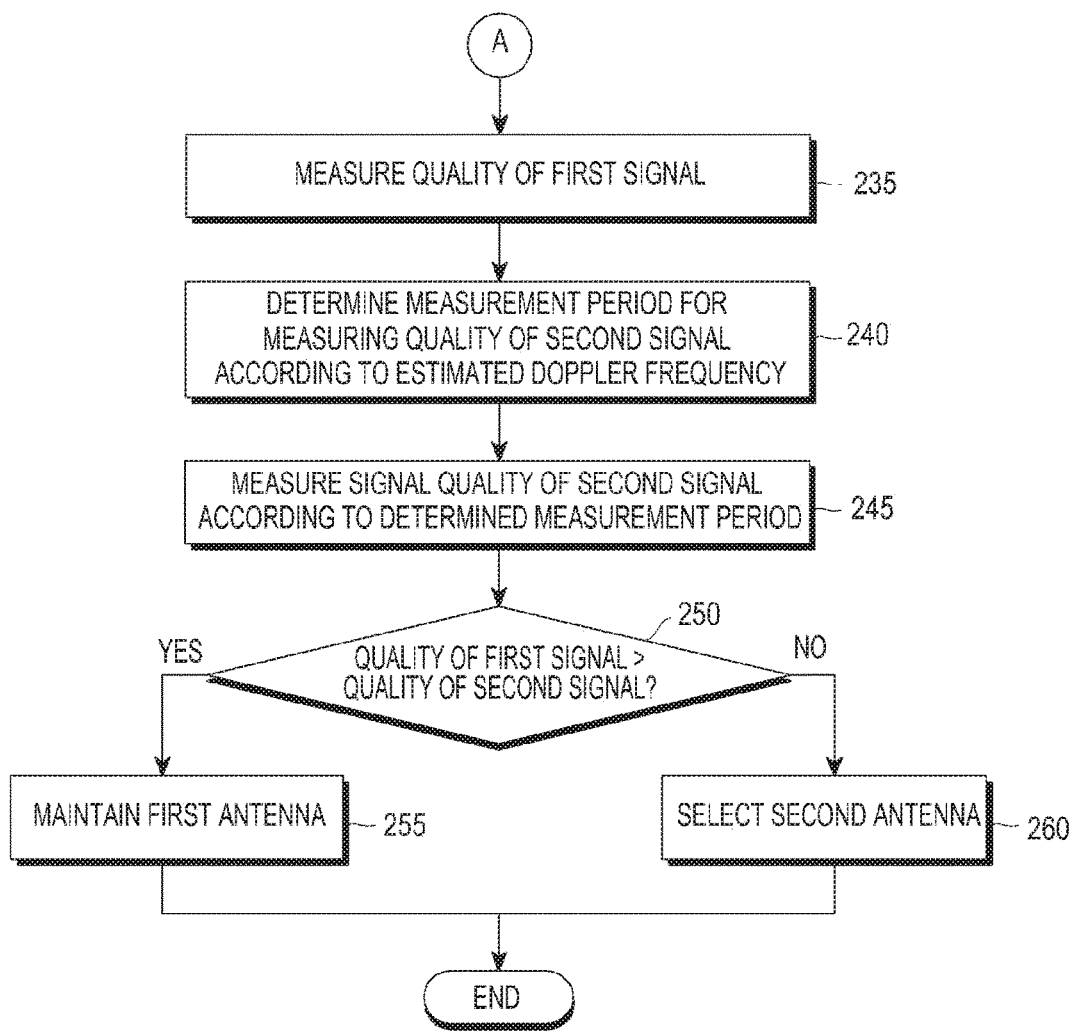

FIGS. 2A and 2B are flowcharts of methods of controlling the communication device 100 according to various embodiments of the present disclosure.

Referring to FIG. 2A, is a flowchart of a method of controlling the communication device 100 according to an embodiment of the present disclosure may include step 200 of receiving a first signal through the first antenna 104a. In the present disclosure, the terms first signal and second signal are used to distinguish between signals received by the first antenna 104a and the second antenna 104b, but the signals are not limited to different signals. That is, the first signal and the second signal may be the same signal or different signals. Further, a case where the second antenna 104b is in a disabled state and only the first antenna 104a is in an enabled state is described as an example in step 200. In the present disclosure, sometimes, the first antenna 104a may indicate an antenna which is currently in an enabled state, and the second antenna 104b may indicate an antenna which is currently in a disabled state (e.g., an "off" state).

The method of controlling the communication device 100 according to an embodiment of the present disclosure may include step 205 of determining whether a type of a network to which the communication device 100 is connected is an N-frequency network type. Step 205 may be performed based on an indicator (e.g., an "N-frequency indicator") indicating an N-frequency network type. More specifically, the processor 102 may determine whether a network type is an N-frequency network type according to whether an N-frequency indicator is received from a Base Station (BS) or whether a received N-frequency indicator indicates an N-frequency network type (for example, "N-frequency indicator=1" in a case of an N-frequency network type and "N-frequency indicator=0" in a case of a 1-frequency network type). An N-frequency indicator may be inserted into a first signal and may be transmitted to the communication device 100, or may be transmitted to the communication device 100 through a path different from a path through which the first signal is received. An N-frequency network type (e.g., a network environment) may refer to a network type in which a frequency F1 (for example, a primary frequency) and a frequency F2 (for example, a working frequency) are different in TD-SCDMA.

Figure 3:
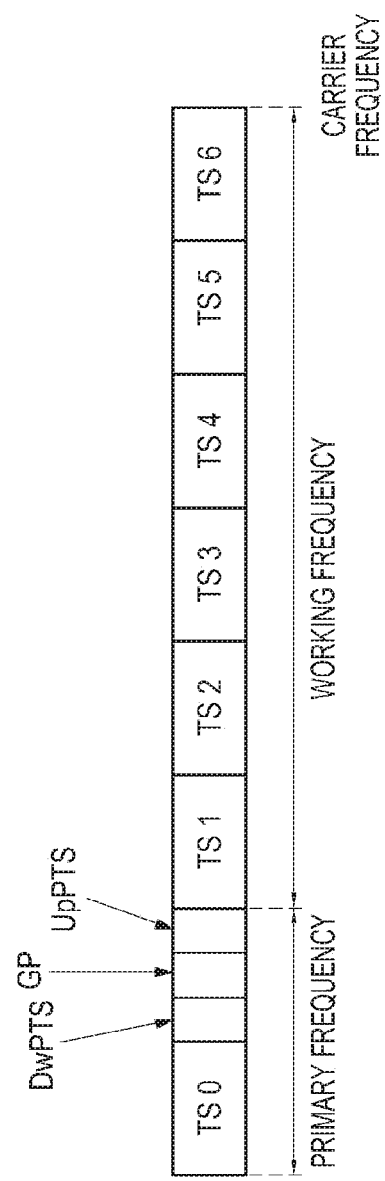
FIG. 3 illustrates a subframe format of time division synchronous code division multiple access (TD-SCDMA)

FIG. 3 illustrates a subframe format of TD-SCDMA.

Referring to FIG. 3, a primary frequency (F1) may refer to a frequency allocated to a time slot (TS) #0 and a Special Slot (SS) of the subframe, and the working frequency (F2) may refer to a frequency allocated to downlink TSs (for example, TS #1 to TS #6). Further, a 1-frequency network type according to the present disclosure may refer to a network type in which the frequency F1 and the frequency F2 are the same frequency.

When a network type is not an N-frequency network type based on a result of the determination in step 205, that is, when a network type is a 1-frequency network type, the processor 102 may perform step 210 of determining whether calibration (for example, direct current (DC) calibration) of the first antenna 104a and the second antenna 104b is performed. Calibration of the first antenna 104a and the second antenna 104b may be performed by the one or more receivers 101a and 101b controlled by the processor 102. When a phase of a reception path or a residual DC offset characteristic is changed according to, for example, a frequency shift or a frequency change, calibration may be performed to calibrate (or correct) the changed phase or residual DC offset characteristic.

The method of controlling the communication device 100 according to an embodiment of the present disclosure may include step 215 of measuring received signal strengths of the first signal and the second signal received through the first antenna and the second antenna, respectively. For performing calibration, both the first antenna 104a and the second antenna 104b should be set to be in the enabled state. Step 215 may be performed while both the first antenna 104a and the second antenna 104b are in the enabled state to perform calibration. After calibration is performed, the processor 102 may make a control to perform step 215 before one of the first antenna 104a and the second antenna 104b enters the disabled state. To this end, the processor 102 may extend a time during which both the first antenna 104a and the second antenna 104b are in the enabled state according to a predetermined time to perform calibration. Alternatively, the processor 102 may make a control to simultaneously perform calibration and step 215. Step 215 may be performed by an RSSI estimation module.

The method of controlling the communication device 100 according to an embodiment of the present disclosure may include step 220 of comparing the measured received signal strength of the first signal and the measured received signal strength of the second signal. The method of controlling the communication device 100 may include step 225 of maintaining a selection of the first antenna 104a and receiving a signal through the first antenna 104a by the processor 102 when the received signal strength of the first signal is stronger than the received signal strength of the second signal based on the result of the determination in step 220. The method of controlling the communication device 100 may include step 230 of selecting the second antenna 104b and receiving a signal through the second antenna 104b by the processor 102 when the received signal strength of the first signal is less than or equal to the received signal strength of the second signal based on the result of the determination in step 220. The received signal strength may be determined (or measured) based on, for example, the RSSI.

The method of controlling the communication device 100 as described above with reference to FIG. 2A may include the step of simultaneously measuring received signal strengths of two (or more) antennas and selecting an antenna according to the measured received signal strength while performing the calibration for simultaneously making the two (or more) antennas be in the enabled state, which creates an effect of using diversity performance advantages while further reducing power consumption. Further, since the frequencies of TS #0 and the downlink TSs (for example, TS #1 to TS #6) are the same (that is, F1=F2), it is possible to select a high reliability antenna.

Unlike FIG. 2A, FIG. 2B is a flowchart of a method of controlling a communication device 100 according to an embodiment of the present disclosure regardless of performing calibration (e.g., calibration is not performed) in which frequency F1 is different from frequency F2.

Referring to FIG. 2B, the method may include step 235 of measuring a quality of a first signal when a network type is an N-frequency network type based on a result of the determination in step 205. The quality of the first signal may include, for example, a SINR or a SNR. According to an embodiment of the present disclosure, the step of measuring the received signal strength of the first signal may be performed simultaneously with step 235 of measuring the quality of the signal or may be performed instead of step 235. Step 235 may be performed by the processor 102 or a SINR estimation module.

The method of controlling the communication device 100 according to an embodiment of the present disclosure may include step 240 of determining a period for measuring quality of the second signal according to a Doppler frequency estimated according to Doppler estimation. The measurement period may decrease as the estimated Doppler frequency increases, and may increase as the estimated Doppler frequency decreases. A relation between the estimated Doppler frequency and the measurement period may be stored in the UE 110 in the form of a mapping table. The processor 102 may determine the measurement period with reference to the mapping table. The measurement period may be determined, for example, in the unit of subframes or time. The Doppler frequency may be estimated based on a committed information rate (CIR) tap position or an SINR variation. Step 240 may be performed by, for example, the processor 102 or a Doppler estimation module. In order to measure the quality of the second signal according to the determined measurement period, the processor 102 may control the one or more receivers 101a and 101b to switch a state of the second antenna 104b to an enabled state.

The method of controlling the communication device 100 according to an embodiment of the present disclosure may include step 245 of measuring the signal quality of the second signal according to the determined measurement period. Similar to the description above for step 235, the signal quality of the second signal may include the SINR or the SNR. The step of measuring the received signal strength of the first signal may be performed simultaneously with step 245 of measuring the quality of the second signal or may be performed instead of step 235. Step 245 may be performed by the processor 102 or an SINR estimation module.

The method of controlling the communication device 100 according to an embodiment of the present disclosure may include step 250 of comparing the measured quality of the first signal and the measured quality of the second signal. Step 250 may additionally or alternatively include the step of comparing the received signal strength of the first signal and the received signal strength of the second signal. Step 250 may be performed by the processor 102.

The method of controlling the communication device 100 according to an embodiment of the present disclosure may include step 255 of maintaining a selection of the first antenna 104a and receiving a signal through the first antenna 104a by the processor 102 when the signal quality of the first signal is better than the signal quality of the second signal (for example, when the SINR of the first signal is greater than the SINR of the second signal) based on the result of the determination in step 250. The method of controlling the communication device 100 to may include step 260 of selecting the second antenna 104b and receiving a signal through the second antenna 104b by the processor 102 when the signal quality of the first signal is worse than the signal quality of the second signal (for example, when the SINR of the first signal is less than or equal to the SINR of the second signal).

The method of controlling the communication device 100 according to an embodiment of the present disclosure may further include a step of initializing a parameter before step 235. The parameter may include at least one of, for example, a measurement period, information on an antenna currently in an enabled state, and information on an antenna currently in a disabled state.

The method of controlling the communication device 100 as described above with reference to FIG. 2B may include the step of periodically measuring signal quality of an antenna in a disabled state according to a measurement period determined based on an estimated Doppler frequency and selecting an antenna even when calibration is not performed and/or when frequencies of TS #0 and downlink TSs (for example, TS #1 to TS #6) are different, which creates an effect of using diversity performance advantages while further reducing power consumption.

Although it has been described that the embodiments of the present disclosure related to FIGS. 2A and 2B are executed in a TD-SCDMA system, the present disclosure is not limited thereto. Various embodiments of the present disclosure may be equally or similarly applied to various communication systems such as an LTE system, an LTE-A system, and the like.

Figure 4:
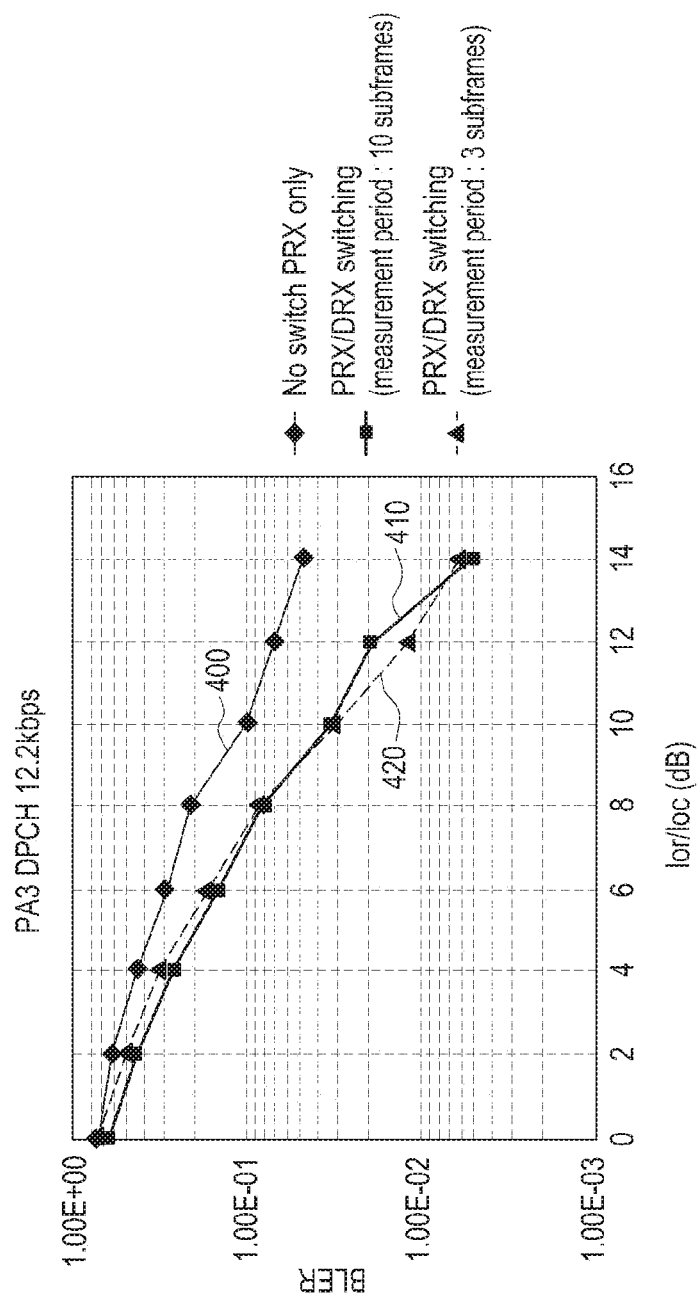
FIGS. 4 and 5 are charts of effects according to embodiments of the present disclosure.
Figure 5:
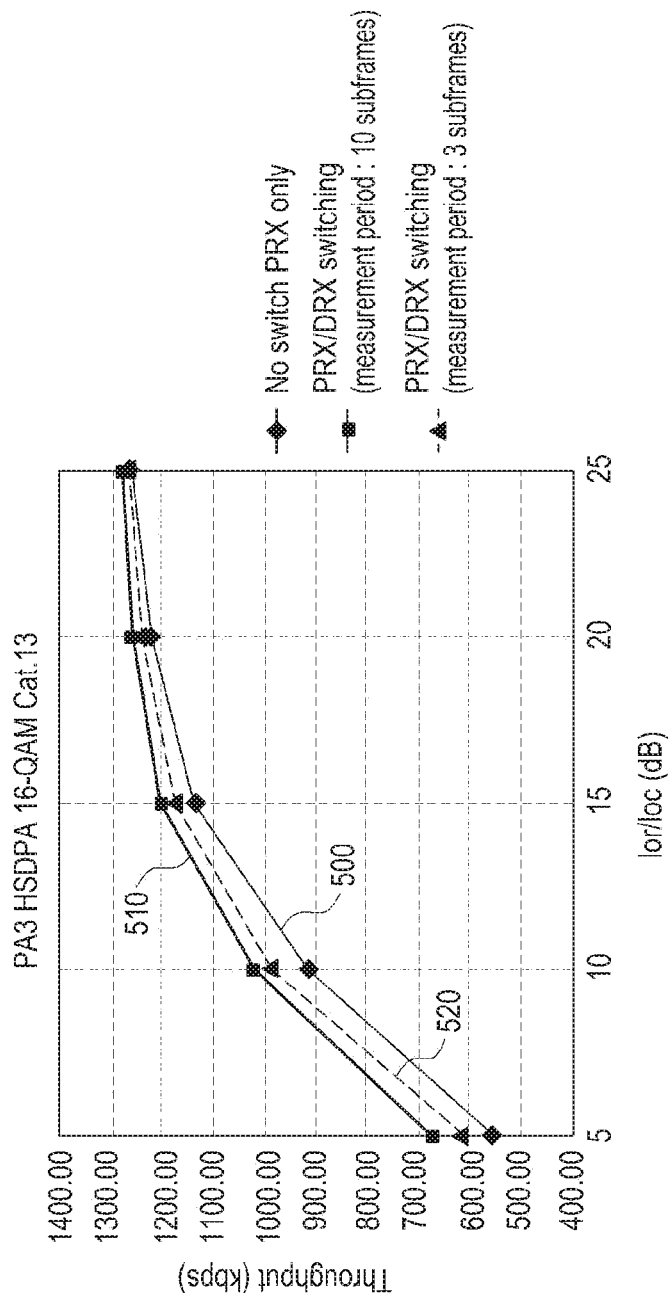

FIGS. 4 and 5 are charts of effects according to embodiments of the present disclosure.

FIG. 4 illustrates results of performance measurement in a dedicated physical channel (DPCH) 12.2 kbps and a high speed physical downlink shared channel (HS-PDSCH) 16 quadrature amplitude modulation (16-QAM) category 13. In FIG. 4, the first antenna 104a is referred to as a primary reception (Rx) path (PRX) and the second antenna 104b is referred to as a diversity rx path (DRX). Further, in an embodiment of the present disclosure, the DPCH has 2 channelization codes and 8 orthogonal channel noise simulators (OCNSs) and the HS-PDSCH has 12 channelization codes and no OCNS. It is assumed that a fading channel uses propagation channel types PA3, VA30, and VA120 of 3GPP and a midamble mode is a default mode, Kcell=8.

Referring to FIG. 4, through a comparison between a measurement result 400 and measurement results 410 and 420 according to embodiments of the present disclosure, it is noted that the measurement results according to the embodiments of the present disclosure have a smaller block error rate (BLER) than the measurement result 400.

Similarly, FIG. 5 illustrates a high-speed downlink packet access (HSDPA) 16-QAM throughput simulation result of TD-SCDMA. When the measurement period corresponds to 10 subframes, it is noted that performance gains 510 and 520 according to various embodiments of the present disclosure are greater than a performance gain 500 according by 2 to 3 dB or more.

The term "module" as recited herein may, for example, indicate a unit including one of hardware, software, and firmware or a combination of two or more of them. The term "module" may be interchangeably used with, for example, the terms "unit," "logic," "logical block," "component," or "circuit." The term "module" may be a minimum unit of an integrated component element or a part thereof. The term "module" may indicate a minimum unit for performing one or more functions or a part thereof. The term "module" may indicate a device that may be mechanically or electronically implemented. For example, the term "module" according to the present disclosure may include at least one of an application-specific integrated circuit (ASIC), a field-programmable gate array (FPGA), and a programmable-logic device for performing operations which are known or will be developed.

According to an embodiment of the present disclosure, at least some of the devices (for example, modules or functions thereof) or the method (for example, operations) may be implemented by a command stored in a non-transitory computer-readable storage medium in a programming module form. An instruction, when executed by a control module (e.g., the processor 102), may cause one or more control modules to execute a function corresponding to the instruction. The non-transitory computer-readable storage medium may be, for example, the memory 103.

The non-transitory computer readable recoding storage medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, program instructions may include high level language code, which may be executed in a computer by using an interpreter, as well as machine code generated by a compiler. The aforementioned hardware device may be configured to operate as one or more software modules in order to perform the operation of the present disclosure, and vice versa.

A programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Various embodiments disclosed herein are provided merely to easily describe technical details of the present disclosure and to help in the understanding of the present disclosure, and are not intended to limit the scope of the present disclosure. Therefore, it is intended that the present disclosure be construed that all modifications and changes or modified and changed forms based on the present disclosure fall within the scope of the present disclosure as defined by the appended claims and their equivalents.

What is claimed is:

1. A communication device, comprising:
    at least one receiver configured to connect to a first antenna for receiving a first signal and a second antenna for receiving a second signal; and
    a processor electrically coupled to the at least one receiver, wherein the processor is configured to measure received signal strengths of the first signal and the second signal based on calibration operation for the first antenna and the second antenna, to select one of the first antenna and the second antenna based on the measured received signal strengths, to control the at least one receiver to receive a signal through the selected one of the first antenna and the second antenna, and to perform the calibration operation based on whether an indicator indicates one frequency type.

2. The communication device of claim 1, wherein the indicator is included in one of the first signal and the second signal.

3. The communication device of claim 2, wherein the processor is further configured to perform the calibration operation if the indicator indicates the one frequency type.

4. The communication device of claim 1, wherein the processor is further configured to select one of the first antenna and the second antenna based on a signal having a greater received signal strength between the measured received signal strengths.

5. The communication device of claim 1, wherein the processor is further configured to control the at least one receiver to receive a signal through the first antenna before performing the calibration operation.

6. The communication device of claim 1, wherein the measured received signal strengths include an estimated received signal strength indicators (RSSIs).

7. A method of controlling a communication device, the method comprising:
    measuring received signal strengths of a first signal and a second signal based on calibration for a first antenna for receiving the first signal and a second antenna for receiving the second signal;
    selecting one of the first antenna and the second antenna based on the measured received signal strengths of the first signal and the second signal; and
    receiving a signal through the selected one of the first antenna and the second antenna,
    wherein the calibration is performed based on whether an indicator indicates one frequency type.

8. The method of claim 7, wherein the indicator is included in one of the first signal and the second signal.

9. The method of claim 8, wherein the calibration is performed if the indicator indicates the one frequency type.

10. The method of claim 7, wherein selecting one of the first antenna and the second antenna comprises selecting one of the first antenna and the second antenna based on a signal having a greater received signal strength between the measured received signal strengths.

11. The method of claim 7, further comprising receiving a signal through the first antenna before performing the calibration.

12. The method of claim 7, wherein measuring received signal strengths comprises the received signal strengths include estimated received signal strength indicators (RSSIs).

13. A communication device, comprising:
    at least one receiver configured to connect to a first antenna for receiving a first signal and a second antenna for receiving a second signal; and
    a processor electrically coupled to the at least one receiver, wherein the processor is configured to
    measure received signal strengths of the first signal and the second signal based on calibration operation for the first antenna and the second antenna,
    select one of the first antenna and the second antenna based on the measured received signal strengths,
    control the at least one receiver to receive a signal through the selected one of the first antenna and the second antenna, and
    perform the calibration operation based on whether an indicator included in one of the first signal and the second signal.

* * * * *